(12) United States Patent
Phelan

(10) Patent No.: US 6,894,600 B2
(45) Date of Patent: May 17, 2005

(54) ENERGY CONSERVATION IN BATTERY POWERED TAG

(75) Inventor: John Roux Phelan, Boulder, CO (US)

(73) Assignee: The Goodyear Tire & Rubber Company, Akron, OH (US)

( * ) Notice: Subject to any disclaimer, the term of this patent is extended or adjusted under 35 U.S.C. 154(b) by 384 days.

(21) Appl. No.: 10/189,927

(22) Filed: Jul. 3, 2002

(65) Prior Publication Data

US 2003/0008692 A1 Jan. 9, 2003

Related U.S. Application Data

(60) Provisional application No. 60/303,214, filed on Jul. 5, 2001.

(51) Int. Cl.[7] .......................... H04Q 5/22; B60C 23/00; B60C 23/02; G01M 17/02; G01N 27/416
(52) U.S. Cl. .................... 340/10.34; 340/442; 340/447; 324/423; 324/434; 73/146; 73/146.5
(58) Field of Search .......................... 340/10.34, 442, 340/447; 324/432, 434; 73/146, 146.5

(56) References Cited

U.S. PATENT DOCUMENTS

| | | | |
|---|---|---|---|
| 5,322,034 A | * 6/1994 | Willham et al. | 340/10.41 |
| 5,368,082 A | 11/1994 | Oare et al. | |
| 5,540,092 A | 7/1996 | Handfield et al. | |
| 5,562,787 A | 10/1996 | Koch et al. | |
| 5,689,248 A | * 11/1997 | Esfahani et al. | 340/853.1 |
| 6,232,875 B1 | * 5/2001 | DeZorzi | 340/442 |
| 6,271,748 B1 | * 8/2001 | Derbyshire et al. | 340/442 |
| 6,292,096 B1 | * 9/2001 | Munch et al. | 340/442 |
| 6,359,556 B1 | * 3/2002 | Katou | 340/447 |
| 2002/0075145 A1 | * 6/2002 | Hardman et al. | 340/442 |
| 2002/0075146 A1 | * 6/2002 | Saheki | 340/447 |

* cited by examiner

Primary Examiner—Brian Zimmerman
Assistant Examiner—Clara Yang
(74) Attorney, Agent, or Firm—Howard M. Cohn

(57) ABSTRACT

Method and apparatus for conserving energy in a battery powered tag which comprises a battery, one or more sensors, and a transmitter. The tag may be used in a pneumatic tire monitoring system which senses and transmits tire pressure and temperature readings. The method fundamentally comprises: hibernating between transmissions by the transmitter; and reading at least one of the sensors after each of a plurality of sleep periods while hibernating. A hibernation period may be ended if one of the sensor readings, preferably tire temperature, is very low, and at least one of a plurality of qualification criteria is met.

20 Claims, 6 Drawing Sheets

ENERGY CONSERVATION IN BATTERY POWERED TAG

CROSS REFERENCE TO RELATED APPLICATIONS

This application claims the benefit of U.S. Provisional Patent Application Ser. No. 60/303,214, filed on Jul. 5, 2001 by Phelan.

TECHNICAL FIELD OF THE INVENTION

The present invention relates to battery powered transmitters, and, more particularly, to methods and apparatus for conserving energy in battery powered tags, especially tags in vehicular tire monitoring systems.

BACKGROUND OF THE INVENTION

Safe, efficient and economical operation of a motor vehicle depends, to a significant degree, on maintaining correct air pressure in all (each) of the tires of the motor vehicle. Operating the vehicle with low tire pressure may result in excessive tire wear, steering difficulties, poor road-handling, and poor gasoline mileage, all of which are exacerbated when the tire pressure goes to zero in the case of a "flat" tire.

The need to monitor tire pressure when the tire is in use is highlighted in the context of "run-flat" (driven deflated) tires, i.e., tires which are capable of being used in a completely deflated condition. Such run-flat tires, typically designed for the passenger vehicle market, as disclosed for example in commonly-owned U.S. Pat. No. 5,368,082, may incorporate, for example, reinforced sidewalls, mechanisms for securing the tire bead to the rim, and/or a non-pneumatic tire (donut) within the pneumatic tire to enable a driver to maintain control over the vehicle after a catastrophic pressure loss, and are evolving to the point where it is becoming less and less noticeable to the driver that the tire has become deflated. The broad purpose behind using run-flat tires is to enable a driver of a vehicle to continue driving on a deflated pneumatic tire for a limited distance (e.g., 50 miles, or 80 kilometers), and at a limited speed, prior to getting the tire repaired, rather than stopping on the side of the road to repair the deflated tire. Hence, it is generally desirable to provide a low tire pressure warning system within the vehicle to alert (e.g., via a light or a buzzer) the driver to the loss of air pressure in a pneumatic tire.

To this end, a number of electronic devices and systems are known for monitoring the pressure of pneumatic tires and providing the operator of the vehicle with either an indication of the current tire pressure, or alerting the operator when the pressure has dropped below a predetermined threshold level. It is known that the air pressure within any closed space such as a pneumatic tire (with a relatively fixed volume) varies with the temperature of the air according to the "ideal gas law". Therefore, many tire pressure monitoring systems incorporate means of measuring the air temperature within the tire and then utilize that temperature measurement to adjust the pressure measurement appropriately. The adjustment, or temperature compensation, of the pressure measurement may be done by the electronic device before reporting (transmitting) the temperature-compensated pressure reading to a monitoring system receiver, or else both the temperature and pressure readings are reported to the receiver. In the latter case, the monitoring system receiver may perform the temperature-compensation, or it may simply record and/or report the temperature reading along with the pressure readings.

Tire monitoring systems are also utilized in truck tires and in much larger tires such as tires for Off-The-Road (OTR) vehicles. In order to transport bulk materials, such as coal, iron ore and other minerals, the mining industry, for example, uses OTR vehicles that typically weigh up to 250 tons or more when fully loaded, with the result that exceedingly high internal stresses are imposed on the tires of such vehicles in the course of their daily use. Such internal stresses, which are primarily attributable to a number of factors including driving at excessive speeds, are so destructive of such tires that it is not uncommon to have to replace the tires. On the other hand, in order to maximize the productivity of OTR vehicles, they are normally driven as fast as possible until a user perceives that the internal physical condition of any given tire is marginal. Whereupon, the operator either stops, in the case of a loss of tire pressure, or reduces the speed of the vehicle, in the case of an excessive temperature condition, to relieve the internal stresses giving rise to the marginal condition, thereby prolonging the life of the tires. Thus the speed of an OTR vehicle is controlled on the basis of the operator's perception of the condition of the tires at any given time. And, if the operator's perception is erroneous, the productivity of the vehicle is unnecessarily reduced. Accordingly, tire monitoring systems are desirable to ensure that the operators of OTR vehicles are provided with accurate information concerning various conditions of the tires of such vehicles, with a view to maximizing the productivity of the vehicles. For these large OTR vehicle tires, tire condition (short of a deflation) is indicated not only by pneumatic pressure, but also by temperatures at critical locations in the tire carcass where the temperature is most closely indicative of a marginal condition signaling an impending breakdown of the tire. For example, it is known for monitoring devices to sense tire temperature at the side edges of the belts, and thus near the shoulder portions of tires, where delaminations of the ply, belts and surrounding rubber materials occur due to the build up of internal stresses.

Due to the difficulty of communicating temperature and pressure sensed within a rotating tire, many of the known electronic devices include transmission capability, typically by radio frequency (RF) means, so that the electronic device is capable of transmitting an RF signal indicative of the tire pressure (and optional other parameters such as temperature) to a remotely-located receiver. Additionally, the electronic device which monitors the tire may have the capability of receiving as well as transmitting signals, in which case the electronic device is referred to as a "transponder".

As used herein, a "transponder" is an electronic device capable of receiving and transmitting signals (typically radio frequency), and impressing variable information (data) in a suitable format upon the transmitted signal indicative of a measured condition (e.g., tire pressure) or conditions (e.g., tire pressure, temperature, revolutions), as well as optionally impressing fixed information (e.g., tire ID) on the transmitted signal, as well as optionally responding to information which may be present on the received signal. "Passive" transponders are transponders powered by the energy of a signal received from an "interrogator", which is a receiver capable of sending a signal to the transponder. "Active" transponders are transponders having their own power supply (e.g., a battery). As used herein, the term "tag" refers either to a transponder having transmitting and receiving capability, or to a device that has only transmitting capability. Generally, tags which are transponders are preferred in vehicular tire monitoring systems. As used herein, the term "tire-pressure monitoring system" (TPMS) or even more simply a vehicular "tire monitoring system" indicates an overall system comprising tags within the tires and a receiver which may be an interrogator disposed within the vehicle.

Choosing between active and passive transponders for use in a particular application is a complex decision-making process. Passive devices are limited by the amount of power they can receive from an interrogator, and the power is limited by considerations of interrogator placement and distance, and by the types of antennas which can be employed in the tire and on the vehicle, to name but two of the factors. Active devices which are battery powered are limited, for example, by the amount of power and energy available from the battery included with the tag, and thus by the life of the battery. It is also known to provide active tag power by including a miniature electric generator within the tire hub, to conduct power to the tire hub through slip rings, etc., but the present invention is addressed primarily to active tags which are battery powered. Obviously, the battery must live long enough to avoid the nuisance of frequent battery changes, and preferably outlives the operational life expectancy of the tire. Thus, conserving energy is an issue for battery powered tags.

The term "battery" is used herein to loosely refer to any type of stored electrical energy device, whether composed of one or more than one cells.

As used herein, the terms power and energy are mainly intended to refer to the overall concept of electrical energy which is available for use by a tag. In a battery powered tag, a limited quantity of electrical energy is stored in a battery, and the battery's energy level is reduced as the tag utilizes the energy to operate the active components of the tag. Although in technical terms, electric "power" is defined as a rate of use of electrical "energy", the term "power" may also be used herein in the common sense of "strength". Thus the strength remaining in a battery may be referred to herein as, for example: battery power, power level, energy level, remaining energy, and the like.

It is known to mount a tag, and associated condition sensor(s) (e.g., pressure sensor and/or temperature sensor(s)) within each tire of a vehicle, and to collect information from each of these transponders with a common single interrogator (or receiver), and to alert a driver of the vehicle to a low tire pressure condition requiring correction (e.g., inflating or replacing the tire). For example, U.S. Pat. No. 5,540,092 (Handfield, et al.; 1996), discloses a system and method for monitoring a pneumatic tire. FIG. 1 therein illustrates a pneumatic tire monitoring system (20) comprising a battery powered transponder (22) and a receiving unit (24). Each transponder has an identification code and is programmed to identify which wheel of the vehicle it is installed upon. A stated object of the Handfield invention is "to provide an ultra-low-power, efficient transmitter for use in a pneumatic tire monitoring system so as to significantly extend the useful battery life." As stated in the Handfield background: "To increase battery life, some prior art devices transmit a signal only when improper inflation is detected. Other devices use the centrifugal force created by rotation of the tire to activate the tire monitoring device. These types of systems allow a window of opportunity for undetected damaging operation to occur. For example, a centrifugally-actuated system would not alert an operator to a flat tire until the vehicle reached a predetermined operating speed. . . . A system which only detects a flat tire would allow operation of an improperly inflated tire which was not yet flat but which could lead to premature tire wear requiring replacement."

Other prior art approaches to battery energy conservation in active tags include transponders which remain in a "sleep" mode, using minimal power, until "woken up" by a signal from an interrogator, or by an internal periodic timer, or by an attached device. These approaches still potentially "waste" battery power by checking and reporting tire conditions unnecessarily often. An example is seen in U.S. Pat. No. 5,562,787, issued to Koch et al., wherein a method and apparatus for monitoring conditions in the tires of vehicles is disclosed. The apparatus comprises an active self-powered programmable electronic device which is installed in or on the interior surface of a pneumatic tire or on a tire rim. This device can be used for monitoring, storing and telemetering information such as temperature, pressure, tire rotations and/or other operating conditions of a pneumatic tire, along with tire identification information. The device includes a power source which can be placed into an active or a dormant mode using a data band switching circuit. The device can be activated by externally transmitted radio frequency waves or microwaves and in response, the device compares or transmits information and provides a warning in the event a preselected limit is exceeded.

It is an aspect of the present invention to provide improved battery energy conservation for battery powered active tags, especially those that are used in tire monitoring systems.

BRIEF SUMMARY OF THE INVENTION

According to the invention, a method is provided for conserving energy in a battery powered tag which comprises a battery, one or more sensors, and a transmitter, wherein the method comprises the steps of: hibernating between transmissions by the transmitter; and reading at least one of the one or more sensors after each of a plurality of sleep periods while hibernating.

According to the invention, the method further comprises the steps of: enabling the one or more sensors after each sleep period but before reading the one or more sensors; and disabling the one or more sensors after reading the one or more sensors.

According to the invention, when the tag further comprises an analog-to-digital converter (A/D), the method further comprises the steps of: enabling the A/D after each sleep period but before reading the one or more sensors; and disabling the A/D after reading the one or more sensors.

According to the invention, the method further comprises the step of: testing the battery to determine battery energy level after a specified number of sleep periods. Optionally, a shorting way is utilized for testing the battery; and the shorting way includes short circuiting the battery terminals for a specified limited amount of time before measuring the battery voltage level and un-shorting the battery terminals.

According to the invention, the method further comprises the step of: ending a period of hibernating if one of the sensor readings is very low and a specified hibernation time limit is reached. Optionally, the sensor with a very low reading is sensing temperature.

According to the invention, the method further comprises the step of: ending a period of hibernating if one of the sensor readings is not very low, and one or more sensor readings is outside of a specified window of allowed values. Optionally, the sensor with a not very low reading is sensing temperature.

According to the invention, the method further comprises the step of: ending a period of hibernating if one of the sensor readings is not very low, and at least one specific sensor has a reading such that a transmitted value difference exceeds a specified threshold limit value, wherein the transmitted value difference is the absolute value of the difference between the specific sensor reading and the last transmitted reading of the specific sensor. Optionally, the sensor with a not very low reading is sensing temperature.

According to the invention, the method further comprises the step of ending a period of hibernating if one of the sensor readings is not very low, and at least one of a plurality of qualification criteria are met, wherein the qualification criteria include: a criterion that one or more sensor readings is outside of a specified window of allowed values; or a criterion that at least one specific sensor has a reading such that a transmitted value difference exceeds a specified threshold limit value, wherein the transmitted value difference is the absolute value of the difference between the specific sensor reading and the last transmitted reading of the specific sensor. Optionally, the sensor with a not very low reading is sensing temperature. Optionally, the method further comprises the step of ending a period of hibernating if one of the sensor readings is not very low and none of the qualification criteria have been met after being checked for a specified limit number of times.

According to the invention, the method further comprises the steps of: testing at least one of the sensor readings against one or more qualification criteria; and ending a period of hibernating if one of the sensor readings is not very low and none of the qualification criteria have been met after testing sensor readings against the qualification criteria for a specified limit number of times.

According to the invention, the method further comprises the steps of determining when a power-on reset (POR) has occurred, and whenever a POR occurs: skipping a sleep period; reading at least one of the one or more sensors; testing the battery; and ending the hibernating to allow transmission by the transmitter.

According to the invention, an energy conserving tag, comprises: a battery, one or more sensors, and a transmitter; means to provide hibernation periods between transmissions by the transmitter; means for reading at least one of the one or more sensors after each of a plurality of sleep periods while hibernating; and means for testing the battery to determine battery energy level after a specified number of sleep periods while hibernating.

According to the invention, the energy conserving tag further comprises: means for testing at least one of the sensor readings against one or more qualification criteria; and means for ending a period of hibernation whenever one of the qualification criteria is met.

According to the invention, a monitoring system with an energy conserving battery powered active tag comprises at least one object to be monitored, a system receiver, and an energy conserving tag mounted to the object to be monitored; and the energy conserving tag comprises: a battery, one or more sensors, and a transmitter; means to provide hibernation periods between transmissions by the transmitter to the receiver; means for reading at least one of the one or more sensors after each of a plurality of sleep periods while hibernating; means for testing the battery to determine battery energy level after a specified number of sleep periods while hibernating; means for testing at least one of the sensor readings against one or more qualification criteria; and means for ending a period of hibernation whenever one of the qualification criteria is met.

According to the invention, the monitoring system is optionally characterized in that: the object to be monitored is a pneumatic tire; the one or more sensors are for sensing tire pressure and one or more temperatures of the tire carcass and of the tire pneumatic filling; transmissions include a pressure reading, one or more temperature readings, and a battery test result; and the qualification criteria include pressure or temperature sensor readings being outside of a specified window; and pressure or temperature sensor readings being different from their last transmitted values by more than a specified threshold value.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Figure 1:
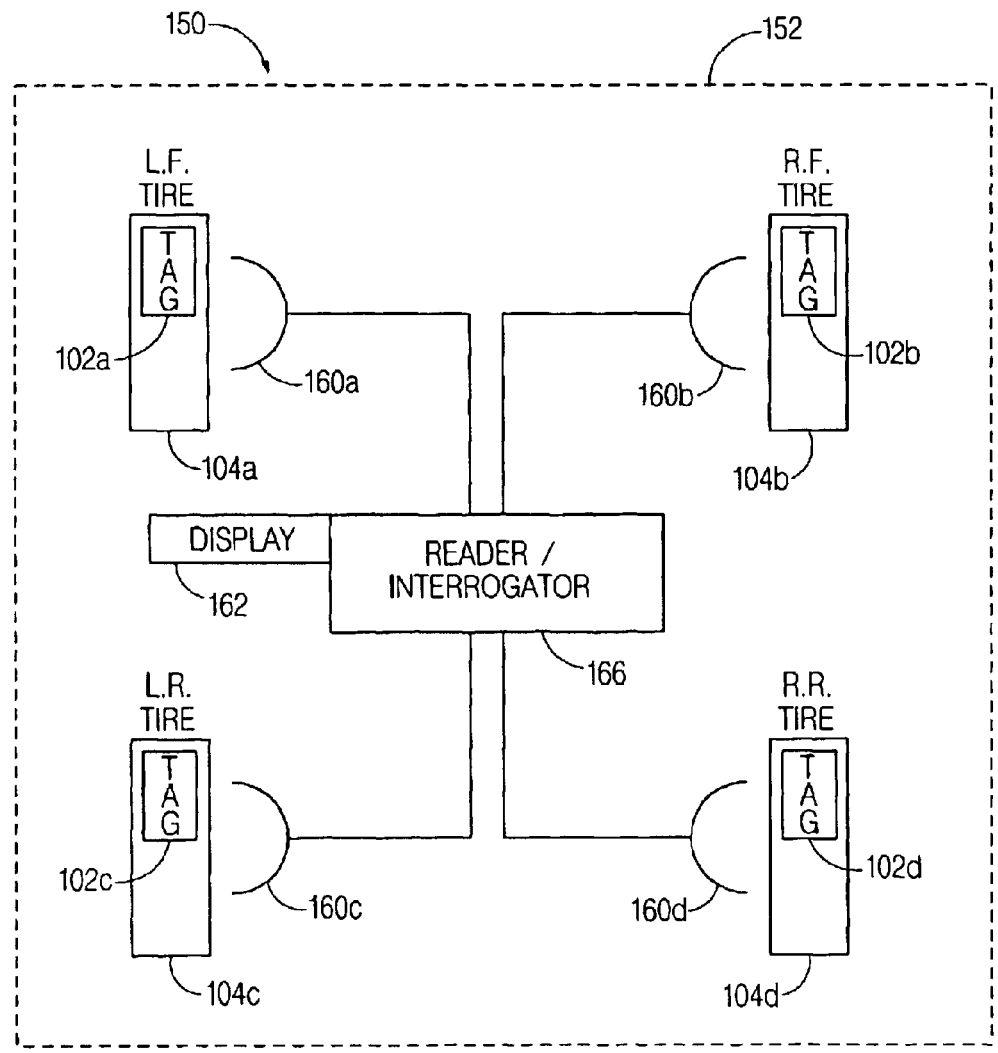
Figure 2:
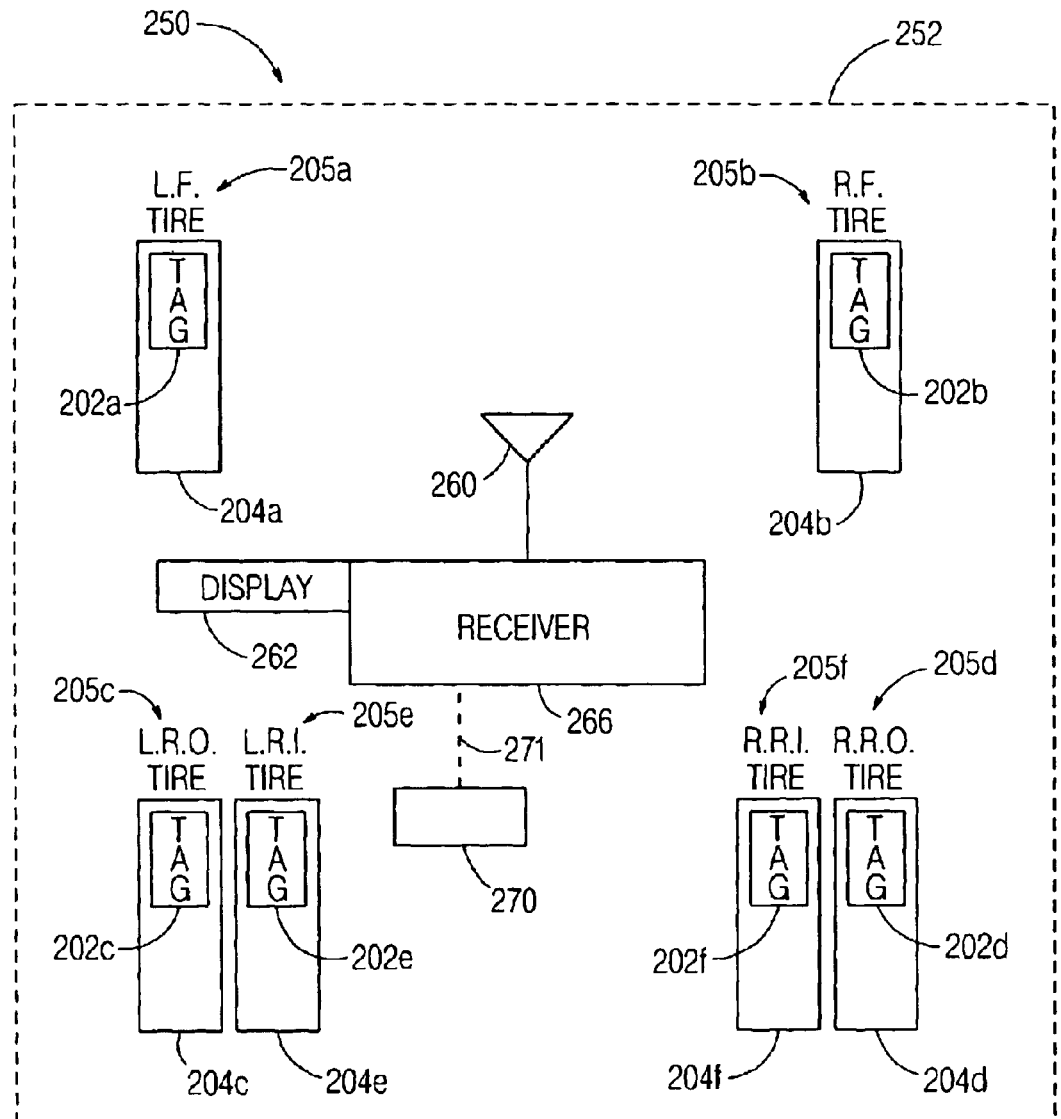

Elements of the figures are typically numbered as follows. The most significant digit (hundreds) of the reference number corresponds to the figure number. Elements of FIG. 1 are typically numbered in the range of 100–199. Elements of FIG. 2 are typically numbered in the range of 200–299. Similar elements throughout the drawings may be referred to by similar reference numerals. For example, the element 199 in a figure may be similar, and possibly identical to the element 299 in an other figure. Elements of the figures can be numbered such that similar (including identical) elements may be referred to with similar numbers in a single drawing. For example, each of a plurality of elements 199 may be referred to individually as 199a, 199b, 199c, etc. Or related but modified elements may have the same number but are distinguished by primes. For example, 109, 109', and 109" are three different elements which are similar or related in some way, but have significant modifications, e.g., a tire 109 having a static imbalance versus a different tire 109' of the same design, but having a couple imbalance. Such relationships, if any, between similar elements in the same or different figures will become apparent throughout the specification, including, if applicable, in the claims and abstract.

Figure 3A:
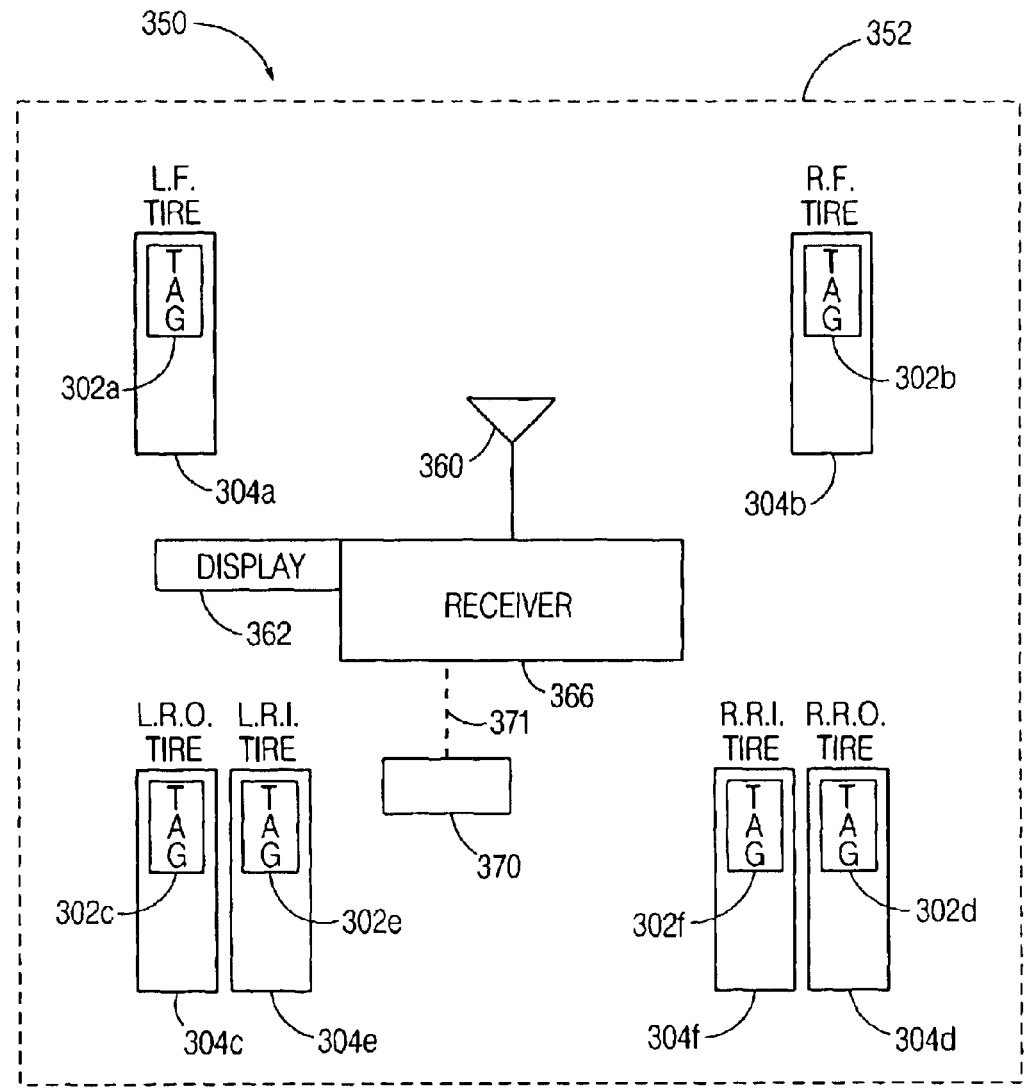
Figure 3B:
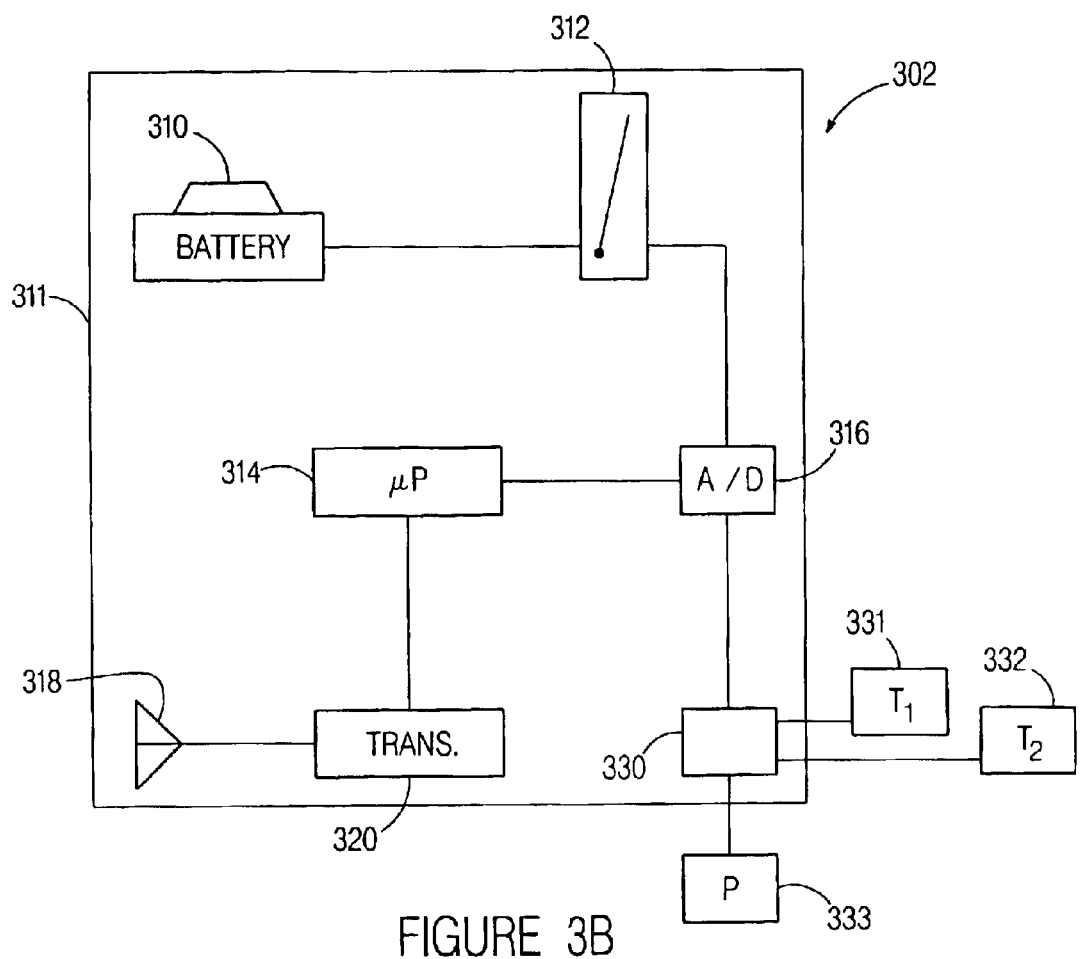
Figure 4:
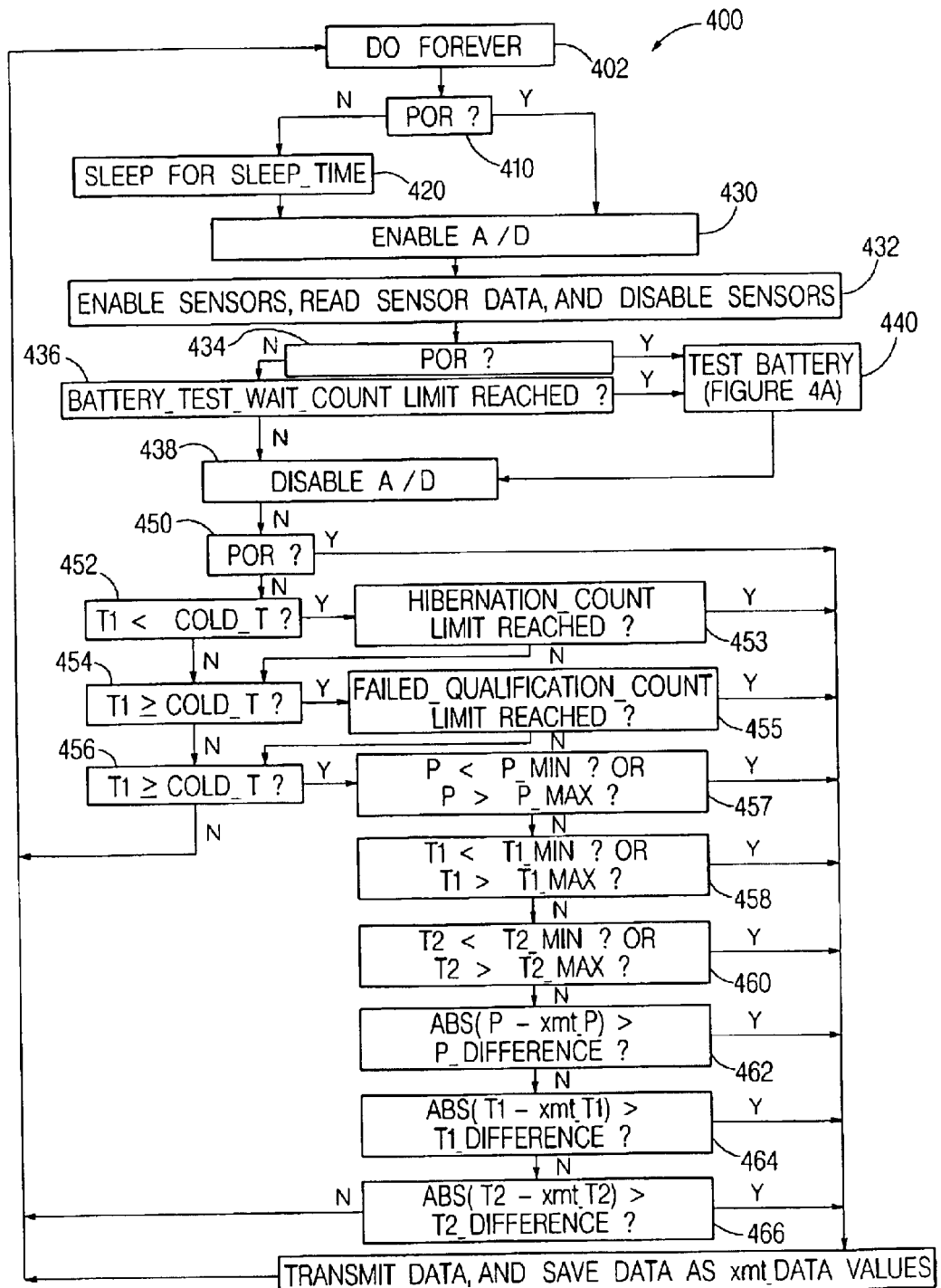

The structure, operation, and advantages of the present preferred embodiment of the invention will become further apparent upon consideration of the following description taken in conjunction with the accompanying drawings, wherein:

FIG. 1 is a block diagram of a typical tire pressure monitoring system, according to the prior art;

FIG. 2 is a block diagram of an off-the-road vehicle tire monitoring system, according to the prior art;

FIG. 3A is a block diagram of an off-the-road vehicle tire monitoring system, implementing an energy conserving tag, according to the invention;

FIG. 3B is a schematic representation of the energy conserving, battery powered active tag of FIG. 3A, according to the invention;

FIG. 4 is a flow chart of a tag control method, according to the invention; and

Figure 4A:
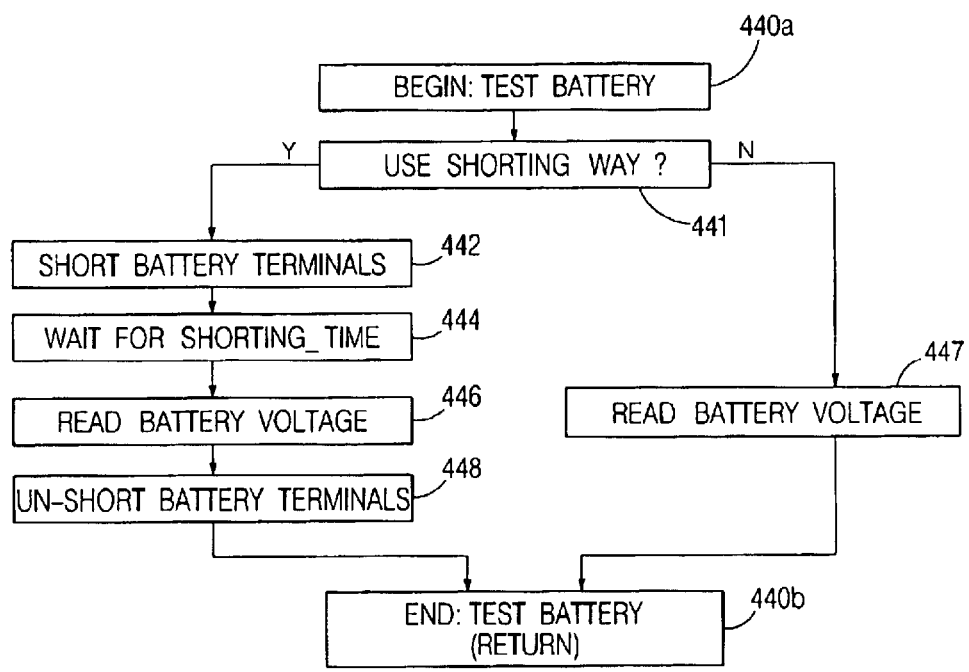

FIG. 4A is an expanded flow chart of a battery testing portion of the tag control method charted in FIG. 4, according to the invention.

DETAILED DESCRIPTION OF THE INVENTION

FIG. 1 illustrates a typical tire pressure monitoring system (TPMS) 150 of the prior art installed on a vehicle 152 (shown in dashed lines), such as a typical passenger vehicle having four pneumatic tires 104a, 104b, 104c and 104d (104) installed on four respective wheels (not shown).

Each of the four tires 104a . . . 104d (104) is equipped with an electronic module ("tag") 102a . . . 102d (102), respectively, and associated sensor(s) (not shown, well known) capable of monitoring one or more conditions such as air pressure and/or air temperature within the tire, and transmitting a radio frequency (RF) signal indicative of the monitored condition(s) within the respective vehicle tire 104. The tags 102 are suitably transponders, but may alternatively simply comprise one or more condition sensors and a radio frequency transmitter. For the purposes of this detailed description, the terms "tag" and "transponder" will be used interchangeably and are intended to refer to the electronic device(s) (e.g., 102) mounted in or on tires (e.g., 104) for monitoring systems (e.g., 150) such as those described herein. As mentioned in the background, passenger vehicle systems typically employ passive tags 102, but active, battery powered tags 102 are also used, especially in larger tires 104 on larger vehicles 152 such as truck tires on trucks. The present invention addresses battery powered tags 102, in particular, regardless of the application tire 104 or vehicle 152.

The system 150 comprises a single reader/interrogator 166 ("receiver") and an associated display unit 162. One or more antennas 160a . . . 160d (160) may be disposed on the vehicle chassis 152 to receive RF transmissions from the tags 102 and, optionally, to interrogate and/or power the tags 102. In this example of a prior art system, four antennas 160 are illustrated, each antenna being disposed at a fixed position on the vehicle adjacent a respective one of the tires 104, within the near field of the respective tag 102. Monitored condition information carried by the RF signals from the respective tags 102 can be decoded (e.g., demodulated) for subsequent display 162 to the operator of the vehicle 152. The "display" 162 may include suitable discernable visual and/or audible warnings at the option of the vehicle manufacturer.

The aforementioned TPMS 150 is presented merely as an example of an overall system installed on a vehicle, and should not be construed as limiting the present invention to a particular implementation, such as having an antenna at each of the wheel wells. Alternatively, as illustrated in FIG. 2, for example, a monitoring system 250 (compare 150) may employ a single antenna 260 (compare 160) disposed in a suitable location to receive the transmissions of all of the tags 202 (compare 102).

FIG. 2 illustrates a monitoring system 250 of the prior art which was improved to test as a preferred embodiment of the present invention. Before improvement by the inventive method and system software, the monitoring system 250 is representative of prior art systems typically installed on off-the-road (OTR) vehicles 252, typically having more than four tires 204, with corresponding tags 202. Each tire 204 and tag 202 is identified by a tire position label such as "left front tire", as determined by a tire position 205 where the tire 204 is mounted. For example, the tire positions 205 and corresponding tires 204 are: a left front (L.F.) tire 205a (tire 204a), a right front (R.F.) tire 205b (tire 204b), a left rear outer (L.R.O.) tire 205c (tire 204c), a left rear inner (L.R.I.) tire 205e (tire 204e), a right rear outer (R.R.O.) tire 205d (tire 204d), and a right rear inner (R.R.I.) tire 205f (tire 204f). Thus tires 204 are identified by their tire position 205 on the vehicle 252. There is a single receiver 266 and an associated optional display unit 262. At least one antenna 260 is centrally disposed on the vehicle chassis 252 to receive RF transmissions from the tags 202 and, optionally, to interrogate and/or power the tags 202. There may be a secondary, backup antenna (not shown) but there is no attempt to dedicate separate antennas to each tire position 205. Instead, each tag 202 transmits a data stream which includes a unique identifying code (ID) stored in each tag 202. The receiver 266 generally comprises some form of radio receiver (possibly with its own microcontroller) and a microprocessor having software for overall system control. A remote device 270, such as a portable computer or even a centralized control system mainframe computer, can be connected 271 to the receiver 266 when needed by way of a serial line, Ethernet line, radio link, etc. Partly due, for example, to the relatively greater RF transmission distances involved for tags 202 in OTR vehicle tires 204, active tags 202 (typically battery powered) are generally employed in OTR vehicle 252 monitoring systems 250.

FIG. 3A illustrates an OTR vehicle 352 tire monitoring system 350, implementing an energy conserving tag 302 according to the invention. The exemplary OTR vehicle 352 has six tires 304 (304a, 304b, 304c, 304d, 304e, 304f), with corresponding inventive tags 302 (302a, 302b, 302c, 302d, 302e, 302f) installed therein. There is a single receiver 366 and an associated optional display unit 362. At least one antenna 360 is centrally disposed on the vehicle chassis 352 to receive RF transmissions from the tags 302 and, optionally, to interrogate the tags 302. A remote device 370 can be connected 371 to the receiver 366 if needed.

FIG. 3B illustrates a schematic representation of the tag 302 (compare 102, 202) which is a battery powered, active tag such as may be used in a vehicle tire monitoring system 150 (i.e., tag 102), and most particularly in the OTR vehicle system 250, 350 (i.e., tag 202, 302). An embodiment of the present invention has been implemented using a tag 302 in an OTR tire monitoring system 350. The tag 302 comprises a number of known components, assembled in a known way to form a battery powered active tag. The present invention lies in the programming of the tag's microcontroller and includes any particular combination and arrangement of components needed to facilitate their functional interaction according to the instructions of the microcontroller. The inventive programming can be considered as a part of the tag (e.g., 302), and by extension, as a part of the overall monitoring system (e.g., 350), since the program implementing an inventive method 400 is stored in the tag (e.g., stored in ROM or EEPROM associated with the microcontroller 314). It is within the scope of the present invention to implement said invention in any battery powered tag having the capability of performing at least an essential subset of the inventive functions (e.g., steps of the method 400) detailed hereinbelow with reference to FIG. 4. For example, it may be possible to implement the inventive method 400 in a battery powered tag having analog control circuitry rather than a microprocessor for the microcontroller of the tag. Therefore, the invention will be described with reference to the embodiment of a tag 302 of FIG. 3B, in the context of the OTR vehicle tire monitoring system 350 of FIG. 3A, but the invention should not be construed to be limited to this particular embodiment.

Referring to FIG. 3B, significant components of the tag 302 are shown schematically along with some of their interconnections. It should be understood that other connections and components of such a tag 302 are also present as needed (e.g., battery voltage supply connections to active components), but are not illustrated herein. The tag 302 (compair 202) is mounted on a suitable substrate 311, such as a printed circuit board, for example, and may be encapsulated (not shown) appropriately for installation by known means in the tire 304. A battery 310 (e.g., a lithium cell) supplies power to the active components of the tag 302. A microcontroller ("controller" or microprocessor $\mu$P) 314 (e.g., a PIC 16c73) implements functional control of the tag 302 according to program instructions stored in memory associated with it (e.g., in ROM or EEPROM, not shown). A sensor interface 330, controlled by the $\mu$P 314, gathers analog readings (typically in the form of voltage levels) front one or more sensors 331, 332, 333 and feeds the analog readings to an analog-to-digital converter (A/D) 316 which converts the analog readings into digital values and supplies the digital values to the microcontroller 314. The one or more sensors typically include a first temperature sensor 331 (measuring, for example, temperature T1 of a selected location in the tire carcass, not shown), a second temperature sensor 332 (optional, but measuring, for example, temperature T2 of the pneumatic filling of the tire), and a pressure sensor 333 (measuring, for example, pressure P of the pneumatic filling of the tire). Note that other systems, such as a passenger vehicle tire monitoring system 150, typically measure only one temperature T2 which is the temperature of the pneumatic filling of the tire. The (analog) voltage level of the battery maybe fed to the A/D 316 through the battery measurement switching circuit 312 under control of the $\mu$P 314. The switching circuit 312 is capable of connecting the battery 310 voltage to tile A/D 316 in two selectable ways. In a first ("direct") way, the connection is direct (battery "high" terminal to A/D analog input "high" terminal, and battery "low" terminal to A/D analog input "low" terminal) and provides an indication of the voltage level of the battery 310 at the time it is connected for measurement, with whatever load happens to be imposed on the battery 310 at that time. In a second ("shorting") way, the terminals of the battery 310 are "shorted" (high battery terminal connected to low battery terminal through a small resistance) for a specified time period (e.g., specified by a parameter named SHORTING_TIME, and having a value of, for example, 1 msec), and also connected to the A/D 316 for a reading of shorted battery voltage level which is taken at the end of the specified time period SHORTING_TIME. A transmitter 320 (e.g., an Inovonics UTSS), also under control of the $\mu$P 314 receives data streams from the $\mu$P 314 and transmits them as message packets by means of an antenna 318. The data streams, formed by the $\mu$P 314, typically include digitized and encoded representations of the sensor readings, the battery voltage, and an ID for the tag 302. In the tag 302 embodiment of the present invention, timers in the program of the $\mu$P 314 are based on the output "tick" of an oscillator which is present in the Inovonics UTSS transmitter 320. Of course, any suitable oscillator can be used to provide timing pulses for the $\mu$P 314.

It should be understood that running the microcontroller 314 program in the background uses only a minimal amount of battery energy. Operating and reading the sensors 331, 332, 333 by means of sensor interface 330 and the A/D 316 requires a bit more energy. Reading the battery voltage level by the direct way does not use much energy, but also does not provide a very accurate indication of the energy remaining in the battery 310. Reading the battery voltage using the shorting way imposes a significant drain of battery energy in proportion to the magnitude of the specified time period SHORTING_TIME, but provides an accurate indication of the energy remaining in the battery 310. While transmitting, the transmitter 320 also requires a significant amount of energy from the battery 310. Therefore, in order to maximize the life of the battery 310, the present invention conserves battery energy by methods of controlling battery-energy-using operations of the tag 302, preferably in proportion to the amount of battery energy usage each operation imposes.

The present invention seeks to improve energy conservation in battery powered active tags such as tags 102, 202, 302 when they are employed in monitoring systems such as the prior art tire monitoring systems 150 and 250. It should be apparent that various aspects of the invention are applicable to any battery powered transmitting device also having one or more sensors and a microcontroller.

The inventive method 400 is illustrated by a flow chart in FIGS. 4 and 4A. For a preferred embodiment, the method 400 has been programmed in the C++ programming language and implemented in a PIC microcontroller which forms part of the active tag 302 that is part of the OTR vehicle 352 tire monitoring system 350. It should be noted that the inventive method 400 can be programmed in any suitable control language and implemented in any suitable microcontroller that is incorporated in a battery powered active tag (e.g., 102, 202, 302), especially those installed in pneumatic tires (e.g., 104, 204, 304) for vehicular tire monitoring systems (e.g., 150, 250, 350). The following description is simplified to its essential non-obvious elements, therefore details which are part of normal software engineering practice are omitted, such as, for example, handling of timing roll-over for timers which are "left running", decrementing and re-setting counters at appropriate times, etc.

A summary overview of the method 400, illustrated in FIGS. 4 and 4A, is as follows: Battery 310 energy is conserved by transmitting (using transmitter 320) only when necessary, i.e., only when certain conditions are met, as determined by the tag controller $\mu$P 314, in order to "qualify" transmission. Between transmissions the tag is in "hibernate" mode, but continues to monitor the sensors 331, 332, 333 (through sensor interface 330 and A/D 316) periodically, i.e., after each "sleep" period having a length of time set by a parameter value SLEEP_TIME (e.g., 14 sec). Battery 310 energy is further conserved by disabling the A/D 316 except for while it is digitizing readings, by disabling the sensors 331, 332, 333 except for while they are being read, and by only checking the battery 310 energy level every specified number of sleep periods as determined by the value of a parameter, BATTERY_TEST_WAIT_COUNT (e.g., 4 sleep periods). Furthermore, the direct way or the shorting way for battery testing may be selected by "patching in" appropriate parameter values when the $\mu$P 314 program is initially stored in the tag 302. A separate parameter can be used to specify the battery test way, or the way can be determined by the value of the BATTERY_TEST_WAIT_COUNT parameter (e.g., defining that the shorting way is only used when the BATTERY_TEST_WAIT_COUNT value is greater than 1). Desired values for various parameters can be patched in, including parameters named, for example: SLEEP_TIME, SHORTING_TIME, BATTERY_TEST_WAIT_COUNT, HIBERNATION_

COUNT, FAILE_QUALIFICATION_COUNT, COLD_T, P_MIN, P_MAX, P_DIFFERENCE, TI_MIN, Ti_MAX, T1_DIFFERENCE, T2_MIN, T2_MAX, T2_DIFFERENCE.

The following Transmission Qualification conditions are checked after each sleep period to determine if transmission is qualified (i.e., allowed). The qualification process is presented hereinbelow in a generic form of "pseudo-code":

* IF (initial power-up, i.e., when battery installed) THEN transmit
* ELSE IF ((Temperature1 is very low) AND (hibernation period is over)) THEN transmit
* ELSE IF ((Temperature1 is NOT very low) AND (failed qualification counter exceeds limit)) THEN transmit
* ELSE IF ((Temperature1 is NOT very low) AND (any of the following criteria is met. . .))
  ** BEGIN CRITERIA . . .
  *1* IF (Pressure out of window) THEN transmit
  *2* ELSE IF (Temperature1 out of window) THEN transmit
  *3* ELSE IF (Temperature2 out of window) THEN transmit
  *4* ELSE IF (difference between Pressure and xmtPressure is over threshold) THEN transmit
  *5* ELSE IF (difference between Temperature1 and xmtTemperature1 is over threshold) THEN transmit
  *6* ELSE IF (difference between Temperature2 and xmtTemperature2 is over threshold) THEN transmit
  ** END CRITERIA
* ELSE continue hibernation (do not transmit, but keep checking sensors and qualification after each sleep period)

The hibernation period, having a time length equal to a count of sleep periods as specified by the parameter HIBERNATION_COUNT (generally rather long, e.g., 128 sleep periods), forces periodic transmission even when the first temperature reading, Temperature1, is very low, i.e., below a temperature specified by a parameter COLD_T (e.g., 5° C.). The failed qualification counter tracks how long (how many sleep periods) the tire 304 has had a Temperature1 above the "very low" COLD_T level but has not otherwise qualified for transmission. When the failed qualification counter exceeds the value of a parameter named FAILED_QUALIFICATION_TIME (e.g., 64 sleep periods, or approx. 15 minutes) transmission is allowed, thereby forcing periodic transmission when the tire 304 is not cold even if the other (following) qualification criteria are not met. Criteria 1, 2, and 3 check for pressure or temperature readings which are outside of a specified "window" range of values. For example, if the Pressure reading is either less than P_MIN, or greater than P_MAX then Pressure is out of the window and transmission is qualified. Similarly, the Temperature1 reading is compared to the values of the parameters T1_MIN and T1_MAX; and the Temperature2 reading is compared to the values of the parameters T2_MIN, and T2_MAX. Criteria 4, 5, and 6 check for pressure or temperature readings which have changed by more than a threshold amount from their value the last time they were transmitted (the xmtpressure, xmtTemperature1 and xmtTemperature2 variable values). For example, if the absolute value of the Pressure reading minus the xmtpressure value is greater than the value of the parameter P_DIFFERENCE, then the difference has exceeded the threshold and transmission is qualified. Similarly, if the absolute value of the Temperture1 reading minus the xmtTemperature1 value is greater than the value of the parameter T1_DIFFERENCE, then the difference has exceeded the threshold and transmission is qualified; and if the absolute value of the Temperture2 reading minus the xmtTemperature2 value is greater than the value of the parameter T2_DIFFERENCE, then the difference has exceeded the threshold and transmission is qualified. If none of the IF or ELSE IF statements of the qualification process are true, then transmission is not qualified and therefore hibernation continues, meaning that the control process of the inventive method loops back to the beginning and waits for another sleep period (with a time length specified by the parameter SLEEP_TIME) before monitoring sensor 331, 332, 333 readings, etc.

As an enhancement to the software implementing the above-described method 400, one or more patchable parameters can be added to enable/disable readings and operations on the readings for the various sensors 331, 332, 333 and the battery 310. For example, a parameter named ENABLE_T2_FLAG could be reset ("FALSE" or zero) in order to prevent reading a second temperature sensor (T2) 332, to prevent A/D 316 digitizing operations for T2 readings, and to skip the logical operations of qualification checking which involve T2 readings.

The inventive method 400 will now be described with reference to the flow chart illustrated in FIGS. 4 and 4A. The method 400 is implemented herein as a microcontroller program 400 which is an infinite loop, starting with the "do forever" step 402 and proceeding through the various following steps until the logic causes control to loop back again to the starting step 402.

Step 410 is to determine if there has been a "power-on reset" (POR), i.e., if a battery 310 has just been installed and the tag 302 has just started working. A system flag can be used to indicate the POR status, and the flag (named, for example, POR) should be "set" whenever the tag 302 detects that it has just been turned on (powered-on), and "reset" (cleared) after the first pass through the control program 400. If a battery has just been installed, as in factory assembly, then factory testing is facilitated by skipping any sleep time, taking readings of all sensors and the battery, and then immediately transmitting the resulting data. Briefly, if the POR flag is set (POR? answer is "Y" for Yes), then sleep step 420 is skipped and steps 430 then 432 are implemented to read the sensor data. The following step 434 produces a Yes result because of the POR flag and therefore the test battery step 440 is also implemented before proceeding to step 438 to complete the data gathering steps. After step 438, step 450 again checks the POR flag and with a Yes result control skips over all remaining logic to go to a transmission step 470, after which the POR flag would be cleared (understood, not shown), and finally control loops back to the starting step 402. It should be noted that in addition to transmitting the data, an important part of the transmission step 470 is to save the data (i.e., the sensor readings and optionally the battery test voltage reading) in separate variables for use later. In the flow chart, the term xmt_DATA refers collectively to xmtPressure (abbreviated xmt_P and used in step 462), xmtTemperature1 (abbreviated xmt_T1 and used in step 464), xmtTemperature2 (abbreviated xmt_T2 and used in step 466), and optionally to xmtBatteryV (not shown in the flow chart 400).

The remaining explanation concerns the method 400 as it is implemented in the steady state (normal) tag operating mode after the first pass through the program. Since the POR flag has been cleared, the POR flag check in step 410 yields an "N" (No) result, and control flows to the sleep step 420, which suspends tag 302 operation for a length of time specified by the SLEEP_TIME parameter. Note that, as used herein, the terms "sleep" and "hibernate" are differentiated in that hibernation is the time period (generally relatively long) between transmissions by the tag 302, and sleep is a time period during which the control program 400 pauses. After the sleep step 420, the tag "wakes up" and resumes operation by reading the sensors 331, 332, 333. As an energy saving measure, the A/D 316 is enabled (turned on) in step 430 and then disabled (turned off) again in step 438 so that it is active only when needed. Also to save energy, the sensors 331, 332, 333 (and their interface 330) are enabled just before the sensors are read, and then disabled again immediately after reading in step 432. As a part of reading the sensor data (step 432), the analog output of each sensor 331, 332, 333 passes through the sensor interface 330 and is input to the A/D 316 where it is digitized and stored as appropriate variable values, optionally also converted by stored conversion equations from voltage values to suitable temperature or pressure readings (or "data"). Thus the analog output of the first temperature sensor 331 is converted to a Temperature1 reading (abbreviated T1), the output of the second temperature sensor 332 is converted to a Temperature2 reading (abbreviated T2), and the output of the pressure sensor 332 is converted to a Pressure reading (abbreviated P).

After the sensor data reading step 432 (and after the step 434 yields a No result from checking the POR flag), step 436 checks to determine if it is time to test the battery 310. To conserve energy, the parameter BATTERY_TEST_WAIT_COUNT specifies a number of sleep periods to wait before testing the battery 310. A counter tracks how many times step 436 has been implemented, and when the counter reaches the value of BATTERY_TEST_WAIT_COUNT, a Yes result transfers control to the test battery step 440. Until then, a No result causes control to skip to the disable A/D step 438. The test battery step 440 comprises several steps which are illustrated in FIG. 4A, which shows the test battery steps in the form of a subroutine which begins at step 440a and ends at step 440b which "returns" to step 440 in order to continue program flow to the following step 438. Step 441 checks to see if the shorting way should be used for the battery test. If the answer is No, then step 447 is to read the battery voltage (without shorting out the battery terminals, i.e., using the non-shorting way described hereinabove), after which the battery test is complete and control flows to the test battery end step 440b. If the step 441 shorting way check yields a Yes result, then the battery terminals are short-circuited (step 442), the controller waits for a period having a time length of SHORTING_TIME (step 444), the battery voltage is read (step 446), and then the battery terminals are un-shorted (step 448) to complete the battery test (i.e., move on to the end step 440b and return to step 440). Reading the battery voltage (steps 446, 447), comprises suitably connecting the battery 310 to the A/D 316, which digitizes the battery voltage reading for storage as a battery voltage variable value which will be included in the data to be transmitted later.

After the disable A/D step 438, step 450 checks the POR status. A No result causes control to flow to a series of qualification tests. First, in step 452, Temperature1 is checked to see if it is less than the value of the parameter COLD_T to determine if the tire 304 is "cold". If No, then control skips to another qualification test, step 454. If Yes, then step 453 checks to see if the hibernation period is over. The parameter HIBERNATION_COUNT specifies a limit to the number of sleep periods allowed before transmitting when the Temperature1 is very low. A counter tracks how many times step 453 has been implemented, and when the counter reaches the value of HIBERNATION_COUNT, a Yes result transfers control to the transmission step 470. Until then, a No result causes control to proceed to the next qualification test, step 454. In step 454, Temperature1 is checked to see if it is greater-than-or-equal-to the value of the parameter COLD_T to determine if the tire 304 is not "cold". If No, then control skips to another qualification test, step 456. If Yes, then step 455 checks to see if transmission qualification has failed an excessive number of times. The parameter FAILEDQUALIFICATION_COUNT specifies a limit to the number of sleep periods allowed before transmitting when the Temperature1 is not very low. A counter tracks how many times step 455 has been implemented, and when the counter reaches the value of FAILED_QUALIFICATION_COUNT, a Yes result transfers control to the transmission step 470. Until then, a No result causes control to proceed to the next qualification test, step 456. In step 456, Temperature1 is checked to see if it is greater-than-or-equal-to the value of the parameter COLD_T to determine if the tire 304 is not "cold". If No, then control loops back to the beginning step 402. If Yes, then control flows to a series of up to six more qualification tests (steps 457 through 466) based on reading values being compared to windows (steps 457, 458, 460) and thresholds (steps 462, 464, 466).

Steps 457 through 466 should be recognized as a series of "OR" tests such that if any one of the tests should have a Yes (True) result, then control will jump to the transmission step 470. A particular order to the tests in steps 457 through 466 is shown in the method 400 embodiment illustrated herein, but it is the intent of the inventor to include within the scope of the inventive method 400, any order of the steps 457 through 466.

In step 457, the Pressure reading (P) is compared to minimum (P_MIN) and maximum (P_MAX) parameter values to determine if the pressure is outside of a specified window (i.e., the window of allowed values comprises pressures between P_MIN and P_MAX). If Yes (P is outside window), then control flows to the transmission step 470. If No, then control flows to the next test, step 458. In step 458, the first temperature (Temperature1 reading or T1) is compared to minimum (T1_MIN) and maximum (T1_MAX) parameter values to determine if the first temperature is outside of a specified window (i.e., the window of allowed values comprises first temperatures between T1_MIN and T1_MAX). If Yes (T1 is outside window), then control flows to the transmission step 470. If No, then control flows to the next test, step 460. In step 460, the second temperature (Temperature2 reading or T2) is compared to minimum (T2_MIN) and maximum (T2_MAX) parameter values to determine if the second temperature is outside of a specified window (i.e., the window of allowed values comprises second temperatures between T2_MIN and T2_MAX). If Yes (T2 is outside window), then control flows to the transmission step 470. If No, then control flows to the next test, step 460.

In step 462, the absolute value of the difference between the Pressure reading (P) and the last transmitted Pressure reading (xmt_P) is compared to a maximum pressure difference value (P_DIFFERENCE) to determine if the absolute value of the difference is over a specified threshold value stored in the parameter P_DIFFERENCE. If Yes (absolute value of the difference between P and xmt_P is greater than P_DIFFERENCE), then control flows to the transmission step 470. If No, then control flows to the next test, step 464. In step 464, the absolute value of the difference between the first temperature (Temperature1 reading or T1) and the last transmitted Temperature1 reading (xmt_T1) is compared to a maximum Temperature1 difference value (T1_DIFFERENCE) to determine if the absolute value of the difference is over a specified threshold value stored in the parameter T1_DIFFERENCE. If Yes (absolute value of the difference between T1 and xmt_T1 is greater than T1_DIFFERENCE), then control flows to the transmission step 470. If No, then control flows to the next test, step 466. In step 466, the absolute value of the difference between the second temperature (Temperature2 reading or T2) and the last transmitted Temperature2 reading (xmt_T2) is compared to a maximum Temperature2 difference value (T2_DIFFERENCE) to determine if the absolute value of the difference is over a specified threshold value stored in the parameter T2_DIFFERENCE. If Yes (absolute value of the difference between T2 and xmt_T2 is greater than T2_DIFFERENCE), then control flows to the transmission step 470. If No, then all of the qualification criteria tests have failed and control loops back to the beginning step 402.

The final step before looping back is the transmission step 470. As detailed above, the transmission step 470 is only implemented when certain qualification tests are passed, thereby ending a hibernation period and allowing the energy-consuming transmission process to proceed. In step 470, in addition to activating the transmitter 320 and transmitting the data stream, certain other tasks are carried out, including especially saving the DATA values in separate variables (xmt_DATA) for use later, as described hereinabove. Not shown, but understood to be a part of the transmission step 470, are various program "housekeeping" operations such as re-setting the POR flag, and, for example, resetting counters such as the HIBERNATION_COUNT and the FAILEDQUALIFICATION_COUNT.

Thus is disclosed a preferred embodiment of a method 400 for conserving energy in battery powered active tags (e.g., 302) when they are employed in monitoring systems (e.g., the tire monitoring system 350). The embodiment comprising an inventive system 350 including an inventive tag 302 which implements the inventive control method 400 has the advantage of better conservation of battery energy compared to prior art tags which, for example, transmit at fixed intervals, either self-determined or triggered by a timer in an interrogator, thereby using battery power unnecessarily. Other prior art tags add the complication of a revolution detector to trigger transmission only when in use. Other prior art tags simply transmit whenever temperature or pressure exceeds an upper limit, but the inventive tag 302 not only has a more sophisticated set of criteria, but also transmits at limited other times in order to provide assurance that the system is still functioning. In addition, the inventive method of limited periodic checks of the battery allows the inventive tag 302 to utilize a more accurate battery shorting way of checking the battery, thereby providing a better indication of remaining battery energy level compared to the previous method of simply checking the battery voltage level, while still limiting the drain on the battery.

Although the preferred embodiment of the inventive method 400 and inventive tag 302 is described in conjunction with monitoring systems 350 which are mounted on vehicles 352 for the purpose of monitoring conditions in pneumatic tires 304 which are mounted on the vehicle 352, it should be noted that the scope of the inventive method 400 is broad enough to encompass other systems which monitor one or more transponders or tags which are battery powered.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A method for conserving energy in a battery powered tag which comprises a battery, one or more sensors, and a transmitter, wherein the method comprises the steps of:

hibernating between transmissions by the transmitter;

reading at least one of the one or more sensors after each of a plurality of sleep periods while hibernating; and testing the battery to determine battery energy level after a specified number of sleep periods;

characterized in that:

a shorting way is utilized for testing the battery; and the shorting way includes short circuiting the battery terminals for a specified limited amount of time before measuring the battery voltage level and un-shorting the battery terminals.

2. A method according to claim 1, further comprising the steps of:

enabling the one or more sensors after each sleep period but before reading the one or more sensors; and disabling the one or more sensors after reading the one or more sensors.

3. A method according to claim 1, wherein the tag further comprises an analog-to-digital converter (A/D), the method further comprising the steps of:

enabling the A/D after each sleep period but before reading the one or more sensors; and disabling the A/D after reading the one or more sensors.

4. A method according to claim 1, further comprising the step of:

ending a period of hibernating if one of the sensor readings is very low and a specified hibernation time limit is reached.

5. A method according to claim 4, characterized in that:

the sensor with a very low reading is sensing temperature.

6. A method according to claim 1, further comprising the step of:

ending a period of hibernating if one of the sensor readings is not very low, and one or more sensor readings is outside of a specified window of allowed values.

7. A method according to claim 6, characterized in that:

sensor with a not very low reading is sensing temperature.

8. A method according to claim 1, further comprising the step of:

ending a period of hibernating if one of the sensor readings is not very low, and at least one specific sensor has a reading such that a transmitted value difference exceeds a specified threshold limit value, wherein the transmitted value difference is the absolute value of the difference between the specific sensor reading and the last transmitted reading of the specific sensor.

9. A method according to claim 8, characterized in that:

the sensor with a not very low reading is sensing temperature.

10. A method according to claim 1, further comprising the step of:

ending a period of hibernating if one of the sensor readings is not very low, and at least one of a plurality of qualification criteria are met, wherein the qualification criteria include:

a criterion that one or more sensor readings is outside of a specified window of allowed values; or a criterion that at least one specific sensor has a reading such that a transmitted value difference exceeds a specified threshold limit value, wherein the transmitted value difference is the absolute value of the difference between the specific sensor reading and the last transmitted reading of the specific sensor.

11. A method according to claim 10, characterized in that:

the sensor with a not very low reading is sensing temperature.

12. A method according to claim 10, further comprising the step of: ending a period of hibernating if one of the sensor readings is not very low and none of the qualification criteria have been met after being checked for a specified limit number of times.

13. A method according to claim 1, further comprising the steps of:

testing at least one of the sensor readings against one or more qualification criteria; and ending a period of hibernating if one of the sensor readings is not very low and none of the qualification criteria have been met after testing sensor readings against the qualification criteria for a specified limit number of times.

14. A method according to claim 1, further comprising the steps of:

determining when a power-on reset (POR) has occurred, and whenever a POR occurs:

skipping a sleep period;

reading at least one of the one or more sensors;

testing the battery; and ending the hibernating to allow transmission by the transmitter.

15. An energy conserving tag, comprising:

a battery, one or more sensors, and a transmitter;

means for providing hibernation periods between transmissions by the transmitter;

means for reading at least one of the one or more sensors after each of a plurality of sleep periods while hibernating; and means for testing the battery to determine battery energy level alter a specified number of sleep periods while hibernating;

wherein the means for testing the battery comprises means for short circuiting terminals of the battery for a specified limited amount of time before measuring the battery voltage level and un-shorting the battery terminals.

16. An energy conserving tag, according to claim 15, further comprising:

means for testing at least one of the sensor readings against one or more qualification criteria; and means for ending a period of hibernation whenever one of the qualification criteria is met.

17. An energy conserving tag, according to claim 15, further comprising:

means for ending a period of hibernating if at least one of a plurality of qualification criteria are met wherein the qualification criteria include;

a criterion that one or more sensor readings is outside of a specified window of allowed values; or a criterion that at least one specific sensor has a reading such that a transmitted value difference exceeds a specified threshold limit value, wherein the transmitted value difference is the absolute value of the difference between the specific sensor reading and the last transmitted reading of the specific sensor.

18. An energy conserving tag, according to claim 15, characterized in that:

an object to be monitored is a pneumatic tire having a carcass;

the one or more censors are for sensing tire pressure and one or more temperatures of the tire carcass and of the tire pneumatic filling.

19. A method for conserving energy in a battery powered tag which comprises a battery, one or more sensors, and a transmitter, wherein the method comprises the steps of:

hibernating between transmissions by the transmitter;

reading at least one of the one or more sensors after each eta plurality of sleep periods while hibernating; and testing the battery to determine battery energy level after a specified number of sleep periods by short circuiting the battery for a specified limited amount of time before measuring the battery voltage level and un-shorting the battery terminals.

20. The method of claim 19, wherein:

an object being monitored by the battery powered tag is a pneumatic tire having a carcass;

the one or more sensors are for sensing tire pressure and one or more temperatures of the tire carcass and of the tire pneumatic filling.

* * * * *